UNITED STATES PATENT OFFICE.

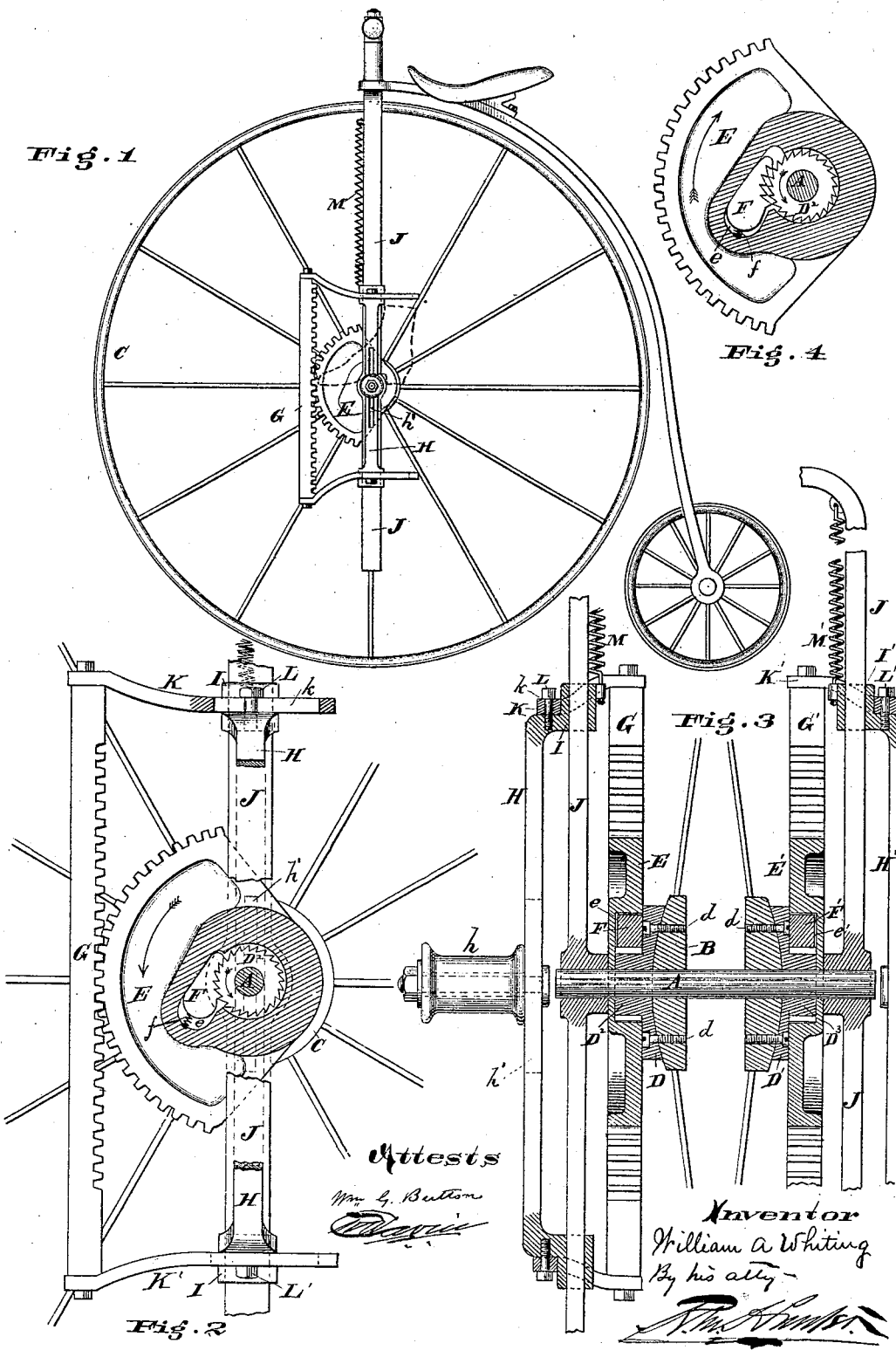

WILLIAM A. WHITING, OF PHILADELPHIA, PENNSYLVANIA, ASSIGNOR TO THE POPE MANUFACTURING COMPANY, OF BOSTON, MASSACHUSETTS.

VELOCIPEDE.

SPECIFICATION forming part of Letters Patent No. 250,316, dated November 29, 1881.

Application filed March 27, 1880. Renewed October 27, 1881. (No model.)

*To all whom it may concern:*

Be it known that I, WILLIAM A. WHITING, of the city and county of Philadelphia, and State of Pennsylvania, have invented an Improvement in Bicycles, of which the following is a specification.

My invention relates to the mechanism attached to bicycles for the purpose of propelling the same; and it consists in constructing and causing certain parts to work in conjunction, whereby a vertical reciprocating motion is converted into a rotary motion; and my invention further consists in so constructing and operating the parts that uniform and increase of power is obtained.

The object of my invention is to obtain increased and continuous power from the same forces, as fully set forth in the following specification.

In the drawings, Figure 1 is a side elevation of a bicycle embodying my invention. Fig. 2 is an enlarged side elevation of driving mechanism. Fig. 3 is a vertical cross-section of same. Fig. 4 is an enlarged view of the clutch mechanism in its upward movement.

A is a shaft, upon which the driving-wheel C is attached through the agency of the hub B. Secured to the sides of the wheel-hub are plates D D', carrying respectively the ratchet-wheels D² and D³. These plates and ratchet-wheels are secured to the hub B by bolts or screws $d$.

Working upon the wheels D² and D³, and against the plates D and D', are segmental gears E and E', carrying respectively the wedge-shaped pawls F and F'. The segmental gears have recesses $e$ and $e'$ for the purpose of holding and actuating the wedge-shaped pawls F and F'. These pawls may be provided with springs $ff'$ to facilitate their action. The outer surface of the segmental gears E and E' are made to act as dust-caps to prevent admittance of dust to the ratchet-wheels and pawls, and which would tend to cut and wear them.

The shaft A is supported in bearings in the ∩-shaped forks J, and on each leg and on either side of the bearings it is made to act as guideways for the slide-boxes I I and I' I', which are respectively connected together by iron pieces H and H'. These pieces H and H' carry the foot-pedals $h$, which are adjustable in slots $h'$.

Meshing with the segmental gears E and E' are racks G and G', which are attached to the pieces H and H' by the bars K and K'. These bars K and K' are supplied with slots $k$ $k'$, through which bolts L and L' pass. By this means the segmental gears E and E' may be taken off and larger ones substituted, and the position of the racks G and G' correspondingly altered. Attached to the sliding boxes or pieces H and H' are the springs M and M', the other ends of which are attached to the ∩-shaped fork J, at or near the top. In practice I would place the springs M and M' behind the legs of the fork, as shown in Figs. 2 and 3.

An important feature of the invention lies in the construction of the pawl and ratchet-wheel. The pawl being made wedge shape and held in a corresponding recess in the segmental gear, should the gear be rotated in the direction indicated by the arrow, Fig. 2, the teeth of the pawl are forced into the spaces between the ratchet-wheel teeth by the wedge-shaped recess descending upon it, and forms a firm and solid connection between the segmental gear and the driving-wheel C. When the segmental gear-wheel is rotating, as shown by the arrow, Fig. 4, the wedge-shaped recess ascends, compressing the spring $f$, and finally the pawl is freed of the teeth of the ratchet-wheel and is carried up by the segmental gear.

It would be impossible to use the ordinary construction of pawl, as it has not the strength required, and is not positive enough in its action. This construction of pawl is very positive and strong.

The operation is as follows: The foot is pressed upon the pedal $h$, forcing the rack G down and putting the spring M under tension. This rotates the segmental gear E, forces the pawl F into contact with the ratchet-wheel D², and rotates the driving-wheel C during the continued downward movement of the pedal $h$. This same action now takes place on the opposite side of the wheel C, and at the same time the pressure is taken off the pedal $h$, and the spring M comes into play and draws the neck G up, bringing the segmental gear E to its original position; and at the beginning of this upward movement the pawl F is withdrawn from contact with the teeth of the ratchet-wheel $D^2$, as shown in Fig. 4. By the alternate action of the mechanism on either side of the wheel C the said wheel is rotated continuously in the same direction and with uniform and continuous power. By the use of this mechanism, it is evident that if we press with a uniform force upon the pedal $h$ uniform force is transmitted to the shaft A of the drive-wheel at all times during the downward movement of the pedal.

With the old method of the crank there are two dead-centers and the upward half of the revolution, which is useless as a driving force, and also there is only one point where the full leverage of the crank can be had, whereas with my improvement I obtain the full leverage during all the downward movement of the pedal, and there is no time when the full force is not applied to rotate the drive-wheel C.

Having now described my invention, what I claim as new, and desire to secure by Letters Patent, is—

1. In a bicycle, the driving-wheel C, in combination with ratchet-wheels $D^2$ $D^3$, pawls F F′, segmental gears E E′, racks G G′, connected to and operated by pedals $h$, and springs M M′, substantially as and for the purpose set forth.

2. In a bicycle, the driving-wheel C, in combination with the ratchet-wheels $D^2$ $D^3$, and segmental gears E E′, oscillating upon the center of the driving-wheel and provided with recesses which support and carry wedge-shaped pawls F F′, all constructed substantially as and for the purpose specified.

3. The combination of ratchet-wheel $D^2$, segmental gear E, provided with a recess, $e$, and carrying the wedge-shaped pawl F, and vertically-reciprocating rack G, all constructed and operated substantially in the manner and for the purpose specified.

4. The combination of ratchet-wheel $D^2$, wedge-shaped pawl F, gear E, rack G, adjustable bar K, sliding piece H, and spring M, all operating substantially as and for the purpose specified.

5. A pawl, F, constructed in the shape of a wedge, in combination with a gear, E, provided with a wedge-shaped recess, $e$, and ratchet-wheel $D^2$, all operating substantially as and for the purpose specified.

6. A pawl, F, constructed in the shape of a wedge, in combination with an oscillating segmental gear, E, or its equivalent, provided with a recess, $e$, in shape corresponding to that of the pawl, by which the pawl is operated, and spring $f$, substantially as and for the purpose specified.

7. In a bicycle in which the driving-wheel is rotated by a reciprocating motion of a piece, H, said piece provided with slot $h'$, in combination with adjustable pedal $h$, substantially as and for the purpose specified.

In testimony of which invention I hereunto set my hand.

WILLIAM A. WHITING.

Witnesses:
 THOS. J. HUNT,
 R. A. CAVIN.